US006011267A

United States Patent [19]

Kubiak et al.

[11] Patent Number: 6,011,267

[45] Date of Patent: Jan. 4, 2000

[54] EROSION RESISTANT NOZZLES FOR LASER PLASMA EXTREME ULTRAVIOLET (EUV) SOURCES

[75] Inventors: Glenn D. Kubiak, Livermore; Luis J. Bernardez, II, Tracy, both of Calif.

[73] Assignee: EUV LLC, Santa Clara, Calif.

[21] Appl. No.: 09/032,224

[22] Filed: Feb. 27, 1998

[51] Int. Cl.[7] .......... H01J 27/00; G01G 4/00

[52] U.S. Cl. .......... 250/423 P; 250/493.1; 378/119

[58] Field of Search .......... 250/504 R, 423 R, 250/423 P, 492.3; 378/119

[56] References Cited

U.S. PATENT DOCUMENTS

| | | | |
|---|---|---|---|
| 4,383,171 | 5/1983 | Sinha et al. | 250/423 P |
| 4,644,576 | 2/1987 | Kuyel | 378/119 |
| 4,894,511 | 1/1990 | Caledonia et al. | 250/423 P |
| 4,940,893 | 7/1990 | Lo | 250/423 R |
| 5,577,092 | 11/1996 | Kubiak et al. | 378/119 |
| 5,680,429 | 10/1997 | Hirose et al. | 378/43 |

*Primary Examiner*—Bruce C. Anderson
*Attorney, Agent, or Firm*—Donald A. Nissen

[57] ABSTRACT

A gas nozzle having an increased resistance to erosion from energetic plasma particles generated by laser plasma sources. By reducing the area of the plasma-facing portion of the nozzle below a critical dimension and fabricating the nozzle from a material that has a high EUV transmission as well as a low sputtering coefficient such as Be, C, or Si, it has been shown that a significant reduction in reflectance loss of nearby optical components can be achieved even after exposing the nozzle to at least $10^7$ Xe plasma pulses.

14 Claims, 3 Drawing Sheets

EROSION RESISTANT NOZZLES FOR LASER PLASMA EXTREME ULTRAVIOLET (EUV) SOURCES

STATEMENT OF GOVERNMENT INTEREST

This invention was made with Government support under contract no. DE - AC04 - 94AL85000 awarded by the U.S. Department of Energy to Sandia Corporation. The Government has certain rights in the invention.

BACKGROUND OF THE INVENTION

This invention pertains generally to an improved design for nozzles used in the generation of plasmas and more particularly to an improved design for reducing nozzle erosion in proximity to energetic plasmas.

The generation and use of extreme ultraviolet (EUV) or soft x-ray radiation i.e., light whose wavelength in the range 3.5–15 nm, has wide applicability in the fields of materials science, microlithography and microscopy. Two frequently used sources of such radiation are a laser-produced plasma and synchrotron radiation. With appropriate modification laser plasma sources are as bright as their more expensive synchrotron counterparts and are better suited to a small laboratory or commercial environment. However, typical laser plasma sources using solid metal targets suffer from the disadvantage that they generate particulate ejecta that can damage and/coat nearby optical surfaces to their detriment.

As described in U.S. Pat. No. 5,577,092, incorporated herein in its entirety, a scheme has been developed for generating ultra-low debris laser plasma targets by free-jet expansion of gases. It is well known to those skilled in the art, that the supersonic expansion of a gas, under isentropic conditions, through a nozzle from a region of high pressure to one of lower pressure causes the temperature of the gas to drop. As the temperature of the gas drops the relative intermolecular velocity of the gas decreases and the weakly attractive van der Waals forces that exist between molecules cause condensation of the expanding gas with the subsequent formation of molecular clusters, for example dimers, polymers and eventually droplets. The formation of molecular clusters is a crucial element in efficient laser absorption, subsequent laser heating and EUV radiation production. These clusters, aggregates of atoms or molecules, will respond locally like microscopic solid particles from the standpoint of laser plasma generation. Each cluster has an electron density well above the critical density necessary for efficient absorption of laser energy. In the absence of these clusters, the density of the gas jet at distances 10–30 mm from the orifice is so low that laser energy is not absorbed and a plasma will not be formed.

As shown in FIG. 1 in the above-referenced U.S. patent, hot, dense plasmas that are a source of EUV radiation are produced by high power laser interaction with small gas clouds, or clusters, formed by the aforementioned supersonic expansion of gas through a nozzle (free-jet expansion) into a vacuum chamber. In addition to the fact that in operation it yields many orders of magnitude less debris than more conventional laser plasma sources, this particular method of forming laser plasma sources has a long life of uninterrupted operation by virtue of the fact that periodic replacement of spent target materials, such as metal tape or drum targets, or cleaning and/or replacement of optical components is not required, inexpensive target materials may be used, there is an almost continuous supply of target materials and it permits laser focus far from the nozzle orifice further reducing debris.

While the use of molecular gas clusters has proven beneficial in reducing deposition of debris onto nearby optical surfaces and thus prolonging their useful life it has been found that energetic particles produced by the plasma cause erosion of nearby plasma-facing bodies, such as the surface of the exit end of the nozzle used to produce the gas clusters. The erosion of the plasma-facing parts of the nozzle is undesirable for two reasons: 1) the eroded material deposits on nearby optical surfaces decreasing their reflectance efficiency in the desirable EUV region of the spectrum thereby decreasing their useful life and 2) erosion changes the nozzle shape thereby affecting the ability of the nozzle to form molecular gas cluster laser targets having the desired properties. What is needed is a method for reducing erosion of the plasma-facing part of nozzles used to form the molecular gas clusters that are the source of the EUV radiation emitting plasma.

SUMMARY OF THE INVENTION

The present invention discloses a gas nozzle having an increased resistance to erosion by energetic plasma particles and are, thus suitable for forming gas cluster laser targets to produce EUV radiation emitting plasmas. The approach disclosed here provides for reducing the surface area of the low pressure gas exit end or plasma-facing portion of the nozzle used for forming gas clusters below a critical dimension and further, fabricating the nozzle or, alternatively, the gas exit end, from materials that not only possess high erosion resistance but also are substantially transparent to EUV radiation.

The inventors have recognized that regardless how erosion resistant the material used to fabricate the nozzles some small amount of erosion will still take place over required life of the nozzle (typically≈$10^{10}$ full power pulses). Some of the material eroded from the nozzle will deposit on nearby optical surfaces reducing their reflectivity. Therefore, it will be appreciated that it is desirable to fabricate the nozzle from a material that has high EUV transmission compared to traditional nozzle materials such as stainless steel. Beryllium, carbon and silicon all have high EUV transmission compared with traditional nozzle materials and thus deposition of these materials onto nearby optical surfaces would not degrade their reflectivity as rapidly as traditional nozzle materials, independent of the mechanisms of erosion and deposition. Moreover, Be and C have low sputter yields (i.e., they are particularly resistant to erosion by energetic plasma particles) and thus these materials can yield a double benefit.

DETAILED DESCRIPTION OF THE INVENTION

The present invention provides a gas nozzle having an increased resistance to erosion from energetic plasma particles generated by laser plasma sources. By reducing the surface area of the low pressure exit end or plasma-facing portion of the gas nozzle, further including fabricating the nozzle or, at a minimum, the plasma-facing portion of the gas nozzle from a material that has a high EUV transmission as well as a low sputtering coefficient such as Be, C, or Si, it has been shown that a significant reduction in plasma erosion of the plasma-facing portion of the gas nozzle can be achieved. The result of the reduction in erosion leads not only to a longer useful life for the gas nozzle but also for the adjacent optical components.

Figure 1:
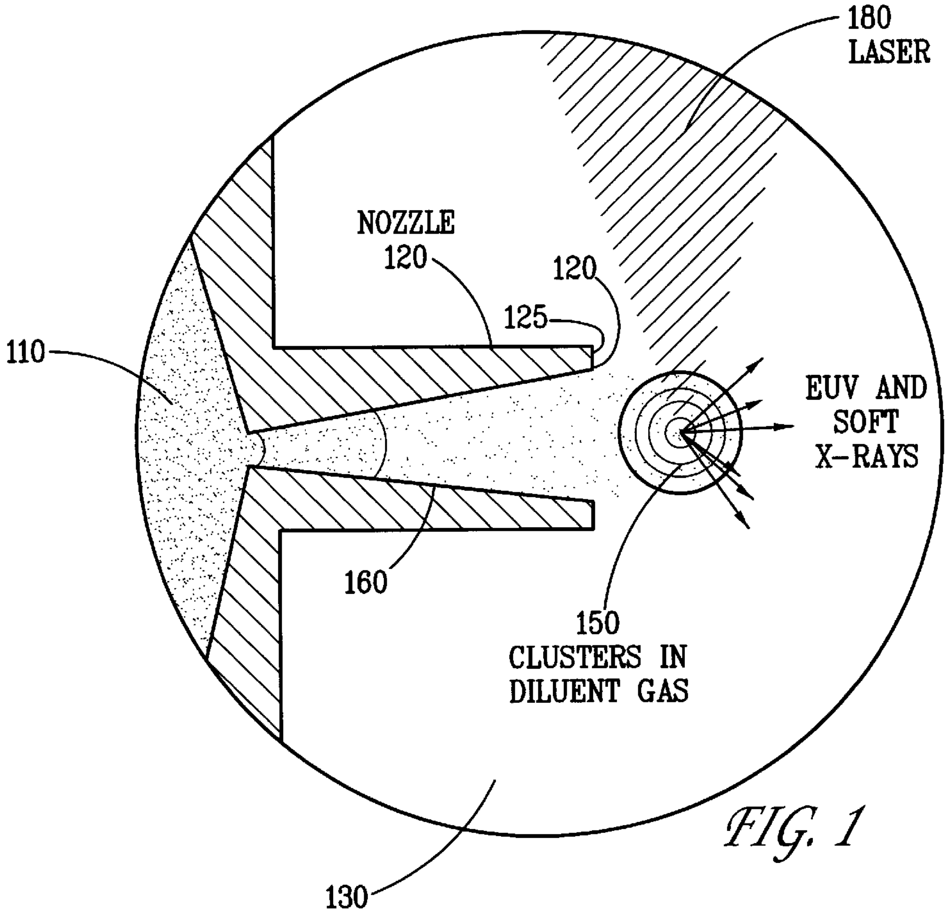
FIG. 1 illustrates the basic nozzle configuration for molecular cluster target formation.

A scheme for producing EUV radiation from an ultra-low debris laser plasma source is shown in FIG. 1. The supersonic expansion of a gas, under isentropic conditions, through nozzle 120 from a region of high pressure 110 to one of lower pressure 130 causes the temperature of the gas to drop. As the temperature of the gas drops the relative intermolecular velocity of the gas decreases and the weakly attractive van der Waals forces that exist between molecules cause condensation of the expanding gas with the subsequent formation of molecular clusters, for example dimers, polymers and eventually droplets. As the gas clusters 150 exit valve orifice 160 they are irradiated by a pulsed laser (not shown) whose light 180 is been brought to a focus in the vicinity of the nozzle exit 125 to produce a plasma which emits EUV and soft x-rays.

For the production of gas clusters of optimum shape and size for the production of EUV radiation it is preferred that a long tapered nozzle be employed since it is known that this shape maximizes the size of the clusters produced. To further increase the production of large clusters, the orifice 160 within nozzle 120 has a conical shape, approximately 25 mm long with a full opening angle of ~10 degrees. The entrance of this cone on the high-pressure side 110 is ~1 mm with the exit on the low pressure side 130 being ~5.4 mm. The inside walls of this conical nozzle should be as smooth as possible to avoid the deleterious effects of flow disruptions and diffuse scattering of the expanding gas flow. It has been found that energetic plasma particles such as ions and neutrals can erode material from that part of the surface of the exit end of nozzle 120 adjacent the plasma 125. The eroded material can be deposited onto nearby optical surfaces causing a loss in reflectance and thus decreasing their useful life. Moreover, the erosion of the low pressure exit end 125 of nozzle 120 can change its shape such that it is no longer able to perform its function properly, such as forming gas clusters of the appropriate size and shape for maximum production of EUV radiation.

From microscopic studies of the plasma-facing portions of gas nozzles exposed to $10^7$ Xe plasma pulses it has been determined that the primary erosion mechanism of that portion of the nozzle was erosion or sputtering by high energy Xe. The inventors have discovered that reducing the area of the exit end or plasma-facing portion of the nozzle is insufficient to reduce significantly erosion of material from that portion of the nozzle. Rather, it has been found that the area of the plasma-facing portion of the nozzle must be reduced below a critical value to effect significant reduction in erosion.

Figure 2:
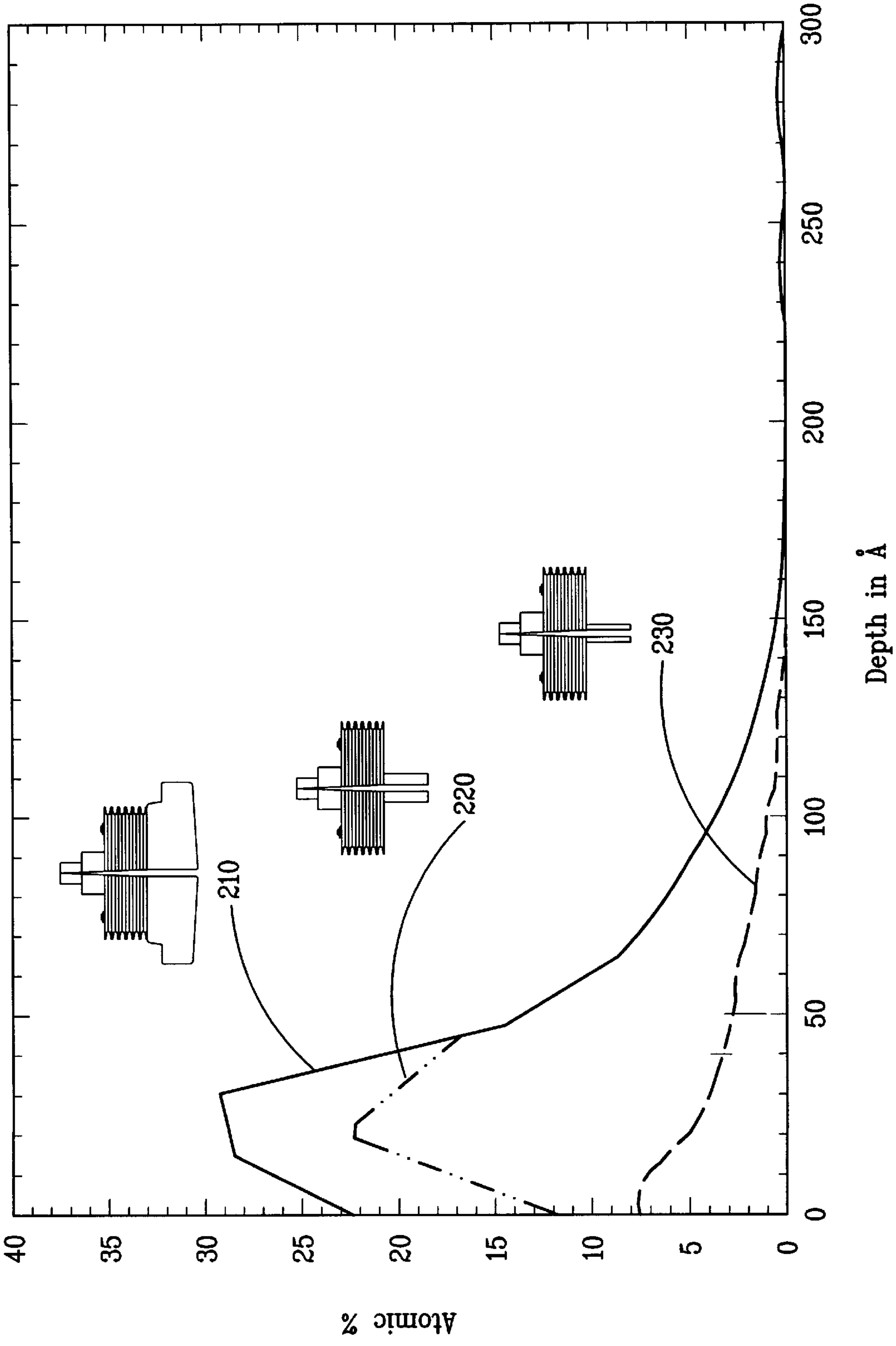
FIG. 2 illustrates nozzle geometries and compares the erosion resistance of stainless steel nozzles with the plasma-facing portion having various surface areas.

Referring now to FIG. 2 which compares the atomic percent of Fe deposited upon a witness plate placed 127 mm from the exit end of plasma-facing portion of a stainless steel nozzle and exposed to $10^7$ Xe plasma pulses. Comparing curves 210 (standard stainless steel nozzle having a plasma-facing surface area of about 159 $mm^2$) and 220 (stainless steel nozzle having a plasma-facing surface area of 6.1 $mm^2$) it can be seen that by reducing the plasma-facing surface area of the nozzle from 159 $mm^2$ to 6.1 $mm^2$ (a factor of about 26 reduction in the area) a slight reduction in material sputtered onto the witness plate was effected, amounting to a factor of about 1.25 (as determined by comparing the areas under the respective witness plate depth profiling curves). However, if the plasma-facing area of the nozzle is reduced to about 1.5 $mm^2$ a 4.6-fold reduction in material sputtered is observed, curve 230. Thus, a further reduction in the plasma-facing surface area of the nozzle, by about a factor of 4, to a value of 1.5 $mm^2$, results in a reduction in material sputtered from that portion of the nozzle by a factor of 3.7 a reduction significantly greater than would be expected, based on the results shown by curves 210 and 220, and low enough to be suitable for use with ultra-low debris laser plasma sources.

In addition to significantly reducing the amount of material eroded from the plasma-facing portion of nozzles by reducing the surface area to less than about 5 $mm^2$, the inventors have found that further improvement can be made by employing materials to make the nozzle, and particularly the exit end or plasma-facing portion of the nozzle, that are substantially transparent to EUV radiation and are more resistant to erosion by energetic plasma particles than commonly used nozzle fabrication materials such as Cu and stainless steel. Materials such as C, Be and Si are particularly suitable for fabricating nozzles (by way of example, the sputter yields of Be and C for an incident 200 eV Xe ion are 0.04 atoms/ion and 0.002 atoms/ion, respectively, as compared to 0.3 atoms/ion for Fe). Moreover, both Be and C/graphite possess better heat transfer properties than stainless steel. Hereinafter the terms C and graphite are considered to be synonymous. This property is particularly desirable because of heating of the exit end of the nozzle by the plasma. However, other materials known to those skilled in the art having the properties of resistance to erosion by plasma particles, a heat transfer coefficient greater than stainless steel, and substantially transparent to EUV radiation are also suitable.

Figure 3:
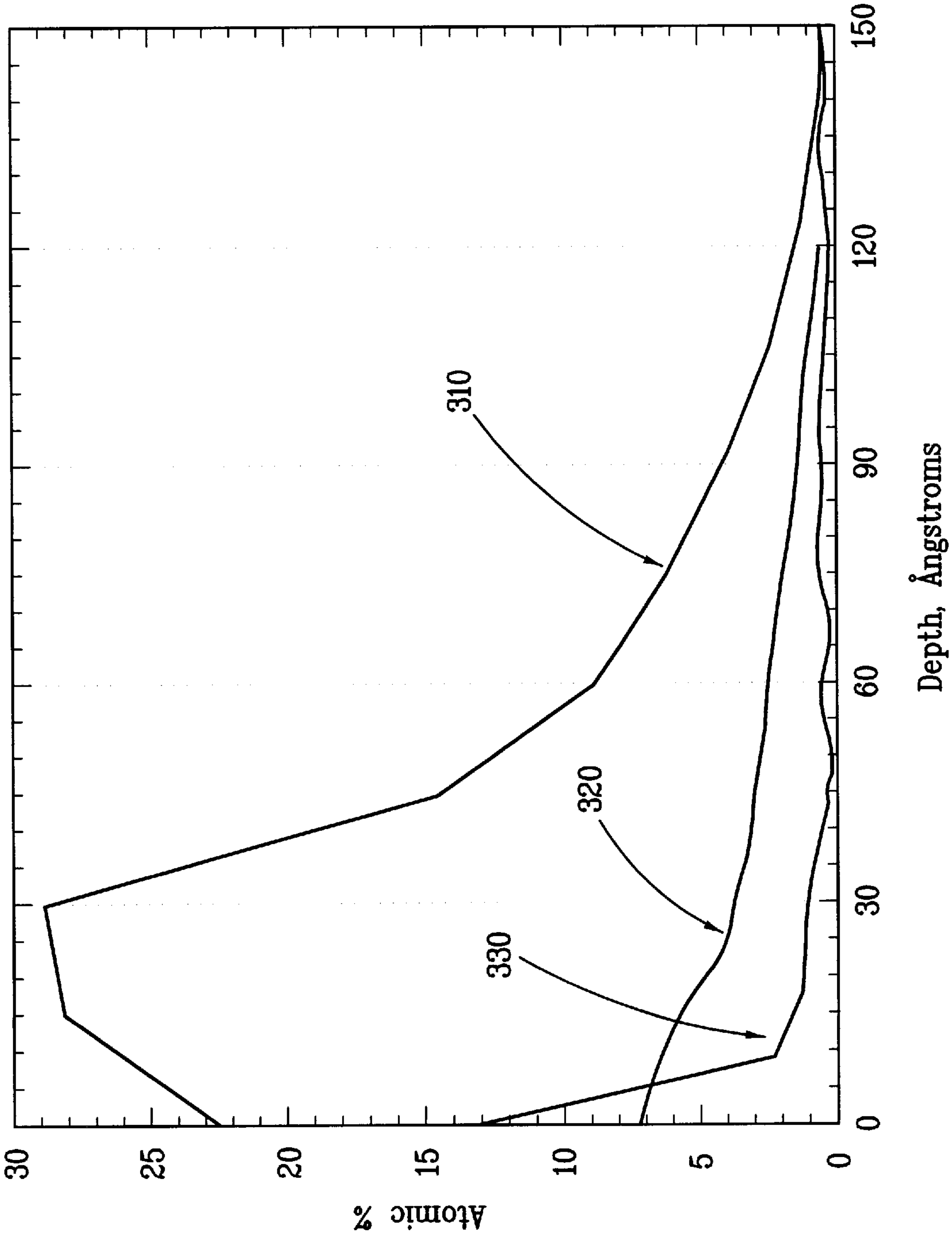
FIG. 3 compares the erosion resistance of stainless steel and graphite nozzles.

Referring now to FIG. 3 which compares the erosion of a standard stainless steel nozzle 310 (expressed as atomic percent of material captured on a witness plate) with that of a nozzle having a reduced plasma-facing surface area, 320, and a stainless steel nozzle having a graphite shield with a "standard" plasma-facing surface area 330 of 160 $mm^2$ after $10^7$ Xe plasma pulses. It is seen that the nozzle having a plasma-facing shield composed of graphite is subject to less erosion than either of the other nozzles, in particular, having a factor of 14 less erosion rate than the standard stainless steel nozzle. It is expected that a graphite shield or graphite nozzle having a reduced plasma-facing surface area will afford additional benefit, as is the case for the reduced area stainless steel nozzle.

Figure 4:
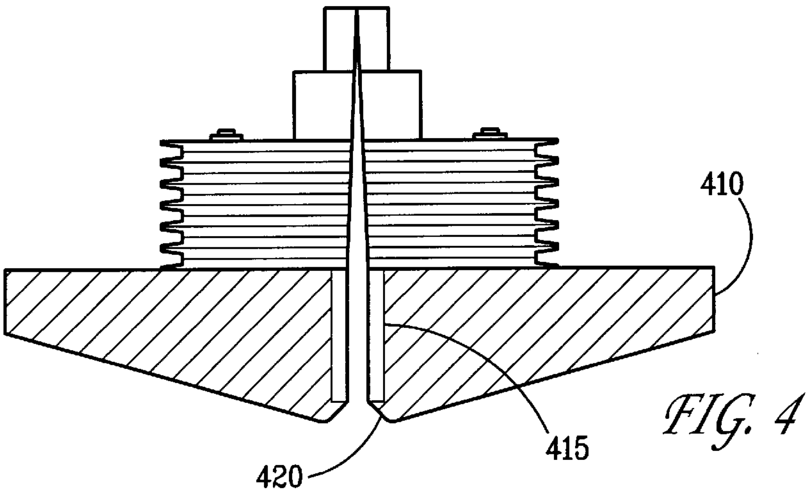
FIG. 4 illustrates a protective cap.

While it is preferable to fabricate the entire nozzle from graphite or Be other embodiments are contemplated such as fabricating only the gas exit end or plasma-facing portion of the nozzle from graphite or Be or coating the nozzle, particularly the plasma-facing portion with C or Be by a process such as physical or chemical vapor deposition, Another method of reducing the erosion of the plasma-facing portion of the gas nozzle is illustrated in FIG. 4. Rather than constructing nozzle 120 from materials that have a high EUV transmission as well as a low sputtering coefficient which can prove to be difficult, an alternative robust configuration is possible. Here, the plasma-facing portion of nozzle 120 is protected from erosion by the plasma by a concentric cap or shield 410 that can be constructed from materials that have a high EUV transmission as well as a low sputtering coefficient such as graphite or Be. In this way, nozzle 120 can be fabricated from more commonly used materials of construction. In the embodiment shown in FIG. 4, graphite cap 410 has a cylindrical aperture 415, designed to accommodate nozzle 120, that is located generally at the center of cap 410. The end of cylindrical aperture 415 proximate the plasma terminates in a chamfered lip 420 that engages and completely covers and thus protects the low pressure exit end 125 of nozzle 120 from erosion by the plasma.

From the foregoing description, one skilled in the art can readily ascertain the essential characteristics of the present invention. The description is intended to be illustrative of the present invention and is not to be construed as a limitation or restriction thereon, the invention being delineated in the following claims.

We claim:

1. A nozzle suitable for generation of gas clusters for laser targets to produce a plasma, comprising:

a) a gas inlet end in communication with a high pressure gas;

b) an opposite low pressure gas exit end adjacent the plasma, wherein the surface area of said gas exit end is less than about 5 $mm^2$; and c) an orifice disposed therebetween.

2. The nozzle of claim 1, wherein the nozzle is constructed from materials that are substantially uneroded by exposure to at least $10^7$ plasma pulses and are substantially transparent to extreme ultraviolet radiation.

3. The nozzle of claim 2, wherein the gas exit end is constructed of materials selected from the group consisting of carbon, beryllium, and silicon.

4. The nozzle of claim 2, wherein said gas exit end is coated with a material selected from the group consisting of carbon, beryllium, and silicon.

5. The nozzle of claim 1, wherein the plasma is a xenon plasma.

6. The nozzle of claim 1, wherein said gas exit end is protected from erosion by the plasma by a cap that engagingly covers said gas exit end.

7. The nozzle of claim 6, wherein the cap is constructed from a material selected from the group consisting of carbon, beryllium, and silicon.

8. The nozzle of claim 1, wherein the surface area of said gas exit end is about 1.5 $mm^2$.

9. The nozzle of claim 1, wherein said gas exit end is in the shape of an annulus.

10. A nozzle for forming gas clusters for the production of EUV radiation from a plasma, comprising:

a) a gas inlet end in communication with a high pressure gas;

b) an opposite low pressure gas exit end adjacent the plasma, wherein the surface area of said gas exit end is less than about 5 $mm^2$; and c) an orifice having a conical shape disposed therebetween, wherein the apex of the cone is located proximal to the gas entrance end of the nozzle and wherein the cone is about 25 mm long with a full opening angle of about 10 degrees.

11. The nozzle of claim 10, wherein the gas exit end is constructed of materials selected from the group consisting of carbon, beryllium, and silicon.

12. The nozzle of claim 11, wherein said gas exit end is coated with a material selected from the group consisting of carbon, beryllium, and silicon.

13. The nozzle of claim 10, wherein said gas exit end is protected from erosion by the plasma by a cap that engagingly covers said gas exit end.

14. The nozzle of claim 13, wherein the cap is constructed from a material selected from the group consisting of carbon, beryllium, and silicon.

* * * * *